United States Patent Office 2,774,749
Patented Dec. 18, 1956

2,774,749

PRODUCTION OF DICYANDIAMIDE-FORMALDE-HYDE CONDENSATION PRODUCTS

Lester N. Stanley, Brookview, and Alois C. Baggenstoss, Delmar, N. Y., assignors to General Aniline & Film Corporation, New York, N. Y., a corporation of Delaware No Drawing. Application November 15, 1952, Serial No. 320,813

3 Claims. (Cl. 260—69)

This invention relates to an improved method for producing condensation products of dicyandiamide and formaldehyde and to the product produced thereby.

It is well known to condense dicyandiamide with formaldehyde in the presence of catalysts and aqueous media. However, the known process is subject to various objections. The product thus formed is usually in solution and it is necessary to separate the product from the solvent, as by a drying step in which the product passes through a gummy stage which is difficult to work and mix. Further the product obtained is a powder tending to be hygroscopic in nature, which is for most purposes an undesirable property.

It is an object of this invention to eliminate the above-mentioned objections and to provide an improved process for condensing dicyandiamide with formaldehyde to obtain an improved product which, in the form of its hydrochloride, is soluble in dilute aqueous acid media. Other objects and advantages will appear as the description proceeds.

The above objects are accomplished by the instant invention which comprises condensing dicyandiamide, formaldehyde and an ammonium salt of a strong acid under acidic anhydrous conditions at an elevated temperature. More particularly, the condensation may be carried out by mixing the dry solids together at an elevated temperature for sufficient time to produce the desired condensation product or by heating a suspension of the solids in an anhydrous inert non-solvent liquid medium for a time sufficient to produce the desired condensation product.

The instant invention eliminates the gumminess and other objections attendant upon drying the product of a similar reaction carried out in the presence of water. Further the product obtained is not hygroscopic and is, therefore, more satisfactory for storage, handling and use.

The product, particularly when combined with other substances (certain metallic compounds, buffering agents, etc.) in dilute aqueous acid media may be used for after-treating dyeings and prints to improve the light fastness and wet fastness properties thereof.

The proportions of reactants may range from about 1 to 3 moles of formaldehyde and 0.5 to 1 mole of ammonium salt per mole of dicyandiamide. While the preferred ammonium salt is ammonium chloride, other salts may be employed such as ammonium phosphate, ammonium bromide, ammonium thiocyanate, ammonium sulphate and the like. While paraformaldehyde is preferred as the formaldehyde reactant because of its outstanding properties with respect to the conditions of reaction and the production of the desired condensate, other anhydrous substances which readily yield formaldehyde under the conditions of the reaction involved may be employed such as trioxymethylene and, under certain conditions, trioxane and hexamethylene tetramine.

The reaction is carried out under acidic conditions, e. g. corresponding to a pH of about 5.0 to 6.8, and at temperatures of about 70 to 150° C. Usually, from about 3 to 6 hours is a sufficient reaction time to yield a condensate having the desired acidic nature and soluble, in the form of its hydrochloride in dilute aqueous acidic media. However, the reaction time may in general range from about 2 to 20 hours depending upon the particular conditions of reaction, relative amounts of reactants, etc.

While the exact nature of the condensation product is not understood, it is believed that during the condensation reaction the ammonium salt decomposes to liberate ammonia and at the same time lend acidity to the reaction medium. The ammonia takes part in the reaction and forms an integral part of the condensation product.

When the process is carried out by mixing the dry components at an elevated temperature, any suitable closed equipment may be employed for handling and mixing dry flakes or powders at elevated temperatures as, for example, a Werner-Pfleiderer mixer, ball mill, grinder and the like. The resulting non-hygroscopic dry condensation product is obtained directly in the form of a powder.

When the process is carried out while suspended in an anhydrous inert non-solvent liquid medium, reflux equipment is preferably employed whereby control of the reaction temperature is facilitated. Any liquid medium may be employed which has a boiling point above the minimum temperature at which the condensation reaction will take place. Preferably, a liquid substance is selected which boils at the temperature at which it is desired to carry out the condensation reaction. Suitable substances are hydrocarbons, such as benzene, toluene, xylene and longer chain petroleum fractions and halogenated hydrocarbons such as chloroethane, ethylene dichloride, chloroform, carbon tetrachloride, chlorobenzene and the like. After the desired condensation reaction has taken place, the liquid medium is readily removed as by filtration, evaporation, etc., leaving the condensation product in a non-hygroscopic powdery form.

The following examples are illustrative of the instant invention and are not to be regarded as limitative.

*Example 1*

59 g. paraformaldehyde in powder or flake form, 30 g. ammonium chloride as a powder and 90 g. dicyandiamide as a powder are mixed well in a mixer. The temperature is adjusted to around 95° C. and is maintained at not over that temperature during mixing for about 4 hours, after which the charge is removed from the mixer. A non-hygroscopic powder is obtained which is ready for use.

An important application for resins of this type is for use as a wash-fastness agent when used as is or in conjunction with a copper salt.

*Example 2*

35 g. ammonium chloride, 75 g. paraformaldehyde and 90 g. dicyandiamide are mixed into 400 cc. benzene. A paste is formed which is mixed well for about 5 hours under reflux. The paste is filtered and the benzene evaporated, leaving a high quality powder.

Various modifications and variations of this invention will be obvious to a person skilled in the art and such variations and modifications are to be regarded as within the purview of this application and the spirit and scope of the appended claims.

We claim:

1. A process comprising condensing from about 1 to 3 moles of paraformaldehyde, 0.5 to 1 mole of ammonium chloride and 1 mole of dicyandiamide under acidic anhydrous conditions at a temperature of about 70 to 150° C.

2. A process for condensing paraformaldehyde ammonium chloride and dicyandiamide comprising mixing said substances in dry form and in molar proportions respectively of about 1–3:0.5–1:1 and heating the mixture at a temperature of about 70 to 150° C. under anhydrous conditions for a sufficient time to produce an acidic condensation product which, in the form of its hydrochloride, is soluble in dilute aqueous acid media.

3. A process for condensing paraformaldehyde, ammonium chloride and dicyandiamide comprising heating a suspension of said substances, in molar proportions respectively of about 1–3:0.5–1:1 in an anhydrous inert non-solvent liquid medium at a temperature of about 70 to 150° C. for a time sufficient to produce an acidic condensation product which, in the form of its hydrochloride, is soluble in dilute aqueous acid media.

References Cited in the file of this patent

UNITED STATES PATENTS

| | | |
|---|---|---|
| 1,952,941 | Ripper | Mar. 27, 1934 |
| 2,106,938 | Tramm et al. | Feb. 1, 1938 |
| 2,405,863 | Treboux | Aug. 13, 1946 |
| 2,593,911 | Neumann et al. | Apr. 22, 1952 |
| 2,662,868 | Kaess et al. | Dec. 15, 1953 |

FOREIGN PATENTS

| | | |
|---|---|---|
| 594,791 | Great Britain | Nov. 19, 1947 |